United States Patent [19]
Hashi

[11] Patent Number: 5,354,978
[45] Date of Patent: Oct. 11, 1994

[54] INFORMATION RECORDING/REPRODUCING APPARATUS

[75] Inventor: Hiroshi Hashi, Tokyo, Japan

[73] Assignee: Olympus Optical Co., Ltd., Tokyo, Japan

[21] Appl. No.: 778,252

[22] Filed: Oct. 17, 1991

[30] Foreign Application Priority Data

Oct. 26, 1990 [JP] Japan .................. 2-290231
Oct. 26, 1990 [JP] Japan .................. 2-290232

[51] Int. Cl.⁵ ............... G06K 13/00; G06K 13/08
[52] U.S. Cl. ........................ 235/475; 235/476; 235/479
[58] Field of Search ............. 235/476, 475, 479, 480

[56] References Cited

U.S. PATENT DOCUMENTS 5,175,423 12/1992 Kayan ................. 235/476

Primary Examiner—Timothy P. Callahan
Assistant Examiner—Trong Phan
Attorney, Agent, or Firm—Frishauf, Holtz, Goodman & Woodward

[57] ABSTRACT

An information recording/reproducing apparatus comprises a housing having a movable front panned in which a card inserting slot for loading an optical card is formed, a cleaning device, provided detachable to the inside of the housing in a card conveying passage on the side of the card inserting slot, for cleaning the optical card to be conveyed, a shuttle reciprocal in the conveying passage in the housing along the conveying passage while holding the optical card, and a lock mechanism capable of locking the shuttle in the conveying passage on the card inserting slot side. The lock mechanism is controlled to lock the shuttle when the cleaning device is detached from the housing, and unlocking a lock state of the lock mechanism when the cleaning device is attached to the housing.

13 Claims, 10 Drawing Sheets

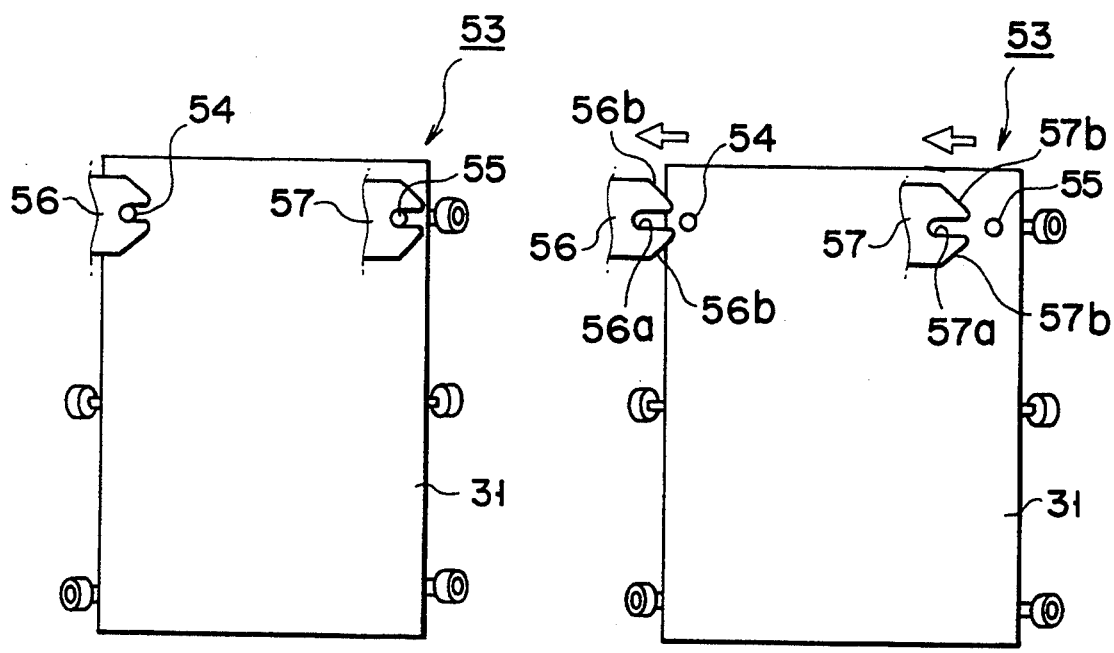
F I G. 4A     F I G. 4B

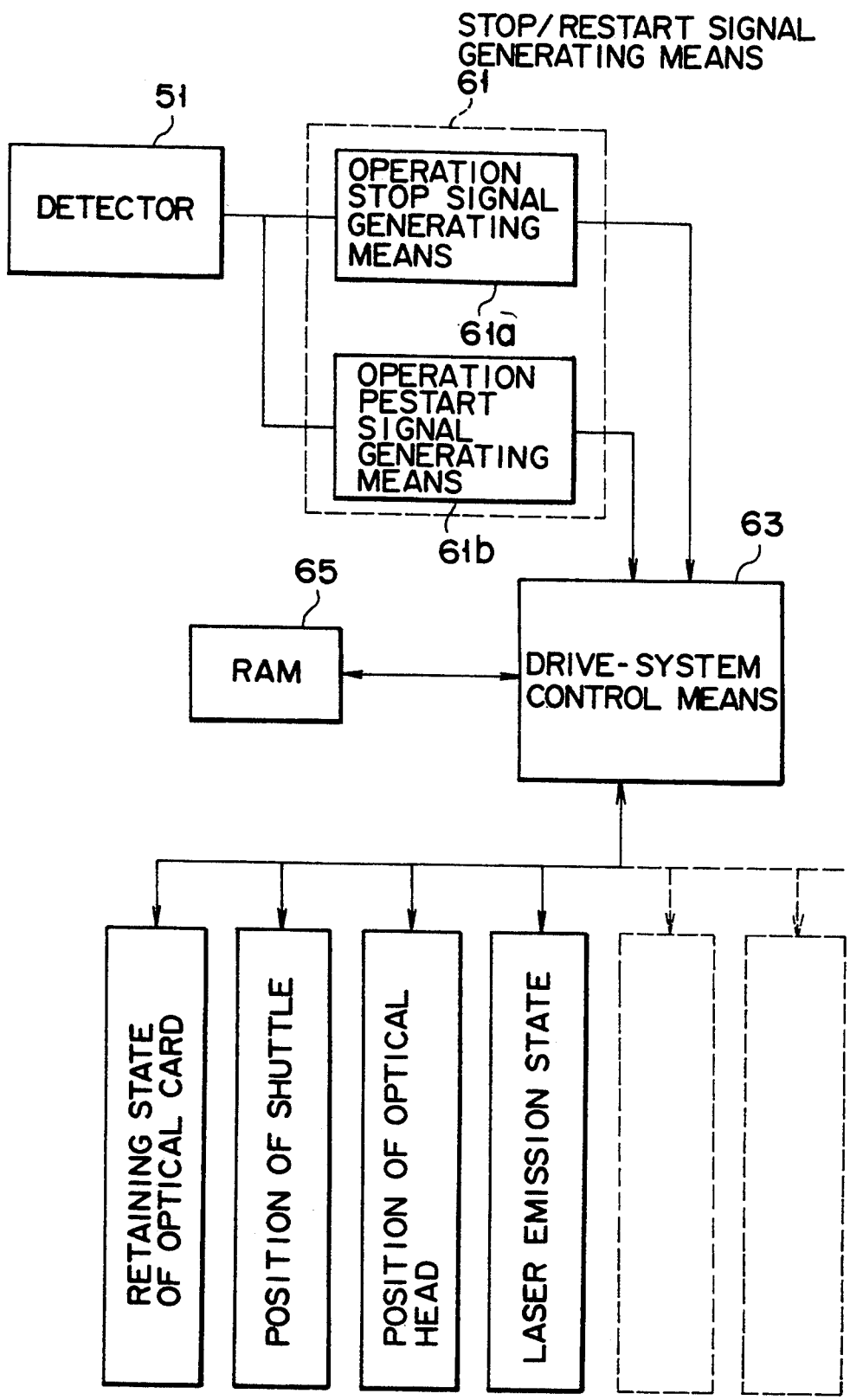
F I G. 9

INFORMATION RECORDING/REPRODUCING APPARATUS

BACKGROUND OF THE INVENTION

1. Field of the Invention

The present invention relates to an information recording/reproducing apparatus for an optical card, which records information on an optical card or reproduces information therefrom.

2. Description of the Related Art

Optical cards have a memory capacity several thousands to ten thousands times that of magnetic cards. While optical cards like optical disks are not rewritable, they have a wider range of applications, such as for use in bankbooks, portable maps and prepaid cards for shopping, due to their large memory capacity of 1 to 2 MB.

An example of an information recording/reproducing apparatus for such an optical card will be described below referring to FIG. 1. In a front panel 9 of the housing of the apparatus is formed a card slot 10 for an optical card 2. This card slot 10 extends inside the apparatus to guide the loading of the optical card 2, with an inclined surface formed at the rear end portion of the card slot 10. The front panel 9 is designed to take two states: the open state (indicated by the solid lines) to the housing, pivotable around the lower end, and the closed state (indicated by the one-dot chain lines).

A shutter 11 is provided at the back of the inclined surface of the card slot 10, and is supported movably up and down by means of a guide pin (not shown). A compression spring 14 is disposed between the shutter 11 and a bottom plate 17 to movably urge the shutter 11 upward. The shutter 11 has an inclined surface formed at its top surface, so that when the shutter 11 is urged upward by the spring 14, this inclined surface closely contacts the inclined surface of the card slot 10, shielding the card loading passage. The shutter 11 is engaged with a solenoid (not shown), and opens the passage for the optical card 2 as it moves downward against the resilient force of the spring 14 due to attraction by the solenoid.

At the back of the shutter 11 are located a cleaning device 12 and an opposing roller 13 facing the cleaning section of the cleaning device 12, so that the optical card 2 can pass therebetween.

The cleaning device 12 is designed to be detachable from the apparatus assembly to permit a user to replace the cleaning member of the cleaning device 12 or the cleaning device 12 itself if used up.

At the back of the cleaning device 12 are disposed rollers 15 and 16 for feeding a card. The roller 15, a drive roller, is located below the passage for the optical card 2, and is coupled to a drive source (not shown) so that it can selectively rotate either in a direction to take the optical card 2 into the apparatus or in a direction to discharge the card out of the apparatus. The other roller 16, a driven roller, is pivotably mounted on an arm which is supported rotatably upward and downward by a link mechanism (not shown). The roller 16 is moved to the lower position indicated by the broken line by drive means (not shown) to firmly abut against the drive roller 15 via the optical card 2, and is freely rotatable together with the roller 15 as the optical card 2 moves.

A detector 21 is attached to the apparatus assembly above the driven roller 16 to detect if the cleaning device 12 is mounted on the apparatus assembly and to output a detection signal. At the back of the rollers 15 and 16 is disposed a shuttle 1 that holds the inserted optical card 2, with guide shafts (not shown) provided on both sides of the shuttle 1 parallel to the loading direction of the optical card 2. The shuttle 1 is supported on the guide shafts by means of bearings to be reciprocal along the guide shafts. The shuttle 1 is driven by a voice coil motor (VCM) disposed therebelow. At the end of the reciprocal region of the shuttle 1 on the front side of the apparatus assembly is provided with a lock mechanism (not shown) which locks the shuttle 1 at the position indicated by the one-dot chain lines.

The lock mechanism can take two states: one to lock the shuttle 1 and a second not to lock the shuttle 1. An optical head 4 is provided where it faces the information recording surface of the optical card 2 held by the shuttle 1. The optical head 4 is movably supported on two guide shafts 5 and 6, extending perpendicular to the reciprocal direction of the shuttle 1, to be freely reciprocal along the guide shafts. Voice coil motors (VCMs) 7 and 8 are disposed outside the guide shafts 5 and 6, respectively, to provide driving power to the optical head 4.

According to the thus constituted recording/reproducing apparatus, the cleaning member of the cleaning device 12 to clean the optical card 2 should properly be replaced in accordance with the length of its usage.

To replace the cleaning member of the cleaning device 12, as indicated by the broken lines, after the front panel 9 is opened to open the front side of the housing, the cleaning device 12 is removed from inside the housing, the cleaning member installed on the cleaning device 12 is replaced with a new one, and the cleaning device 12 is installed again at a predetermined position in the housing.

The front panel 9 is then restored to its closed state as indicated by the solid lines to close the front side of the apparatus, which completes the replacement of the cleaning member of the cleaning device 12, permitting continuous and inherent use of the apparatus.

According to the conventional information recording/reproducing apparatus, when the user opens the front panel 9 and pulls out the cleaning device 12 for its replacement, the VCM 3 is deactivated by the output signal of the detector 21, stopping the shuttle 1 wherever it then is. The passage to the optical head 4 emits a laser beam from the front of the housing or the passage to the objective lens and is just the moving passage for the optical card 2 or the movable region of the shuttle 1. With the cleaning device 12 removed, however, part of the moving passage of the optical card 2 is greatly open so that the user can easily insert some device or tool inside the apparatus.

Further, when the shuttle 1 is stopped at the rear portion of the apparatus assembly, this passage is large so that when the user inserts some device or tool, the apparatus may be damaged. Since there is only one lock position for the shuttle 1, i.e., at the front of the apparatus, the shuttle 1 is not mostly positioned at a certain location except when it is locked. When the device or tool inserted by a user hits the shuttle 1, the shuttle 1 is pushed further back in the apparatus assembly. This provides a large space around the optical head 4, making it very likely to cause damage on the optical head 4 by the inserted device or tool, or hurt the user by the laser beam.

In short, the conventional information recording/reproducing apparatus with the above-described structure has the following shortcomings:

(1) With the cleaning device 12 removed, when the user inserts a long driver or the like through the open space in the apparatus, it may damage the lens or the like of the optical system located inside the apparatus; and (2) When something like a dental mirror is inserted, the laser beam emitted through the objective lens may enter the user's eye, thus hurting it seriously.

SUMMARY OF THE INVENTION

It is therefore an object of the present invention to provide an information recording/reproducing apparatus which can prevent damage to the units inside the apparatus assembly or an accident from occurring due to laser beam emission inside the apparatus assembly at the time of replacement of the cleaning device or the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 4A and 4B are plan views showing a lock mechanism used in this apparatus in different states;

FIG. 9 is a block diagram showing the drive system of the apparatus; and

DETAILED DESCRIPTION OF THE PREFERRED EMBODIMENTS

Various preferred embodiments of the present invention will now be described referring to the accompanying drawings.

First Embodiment

An information recording/reproducing apparatus according to the first embodiment will be described below referring to FIGS. 2, 3, 4A and 4B.

Figure 1:
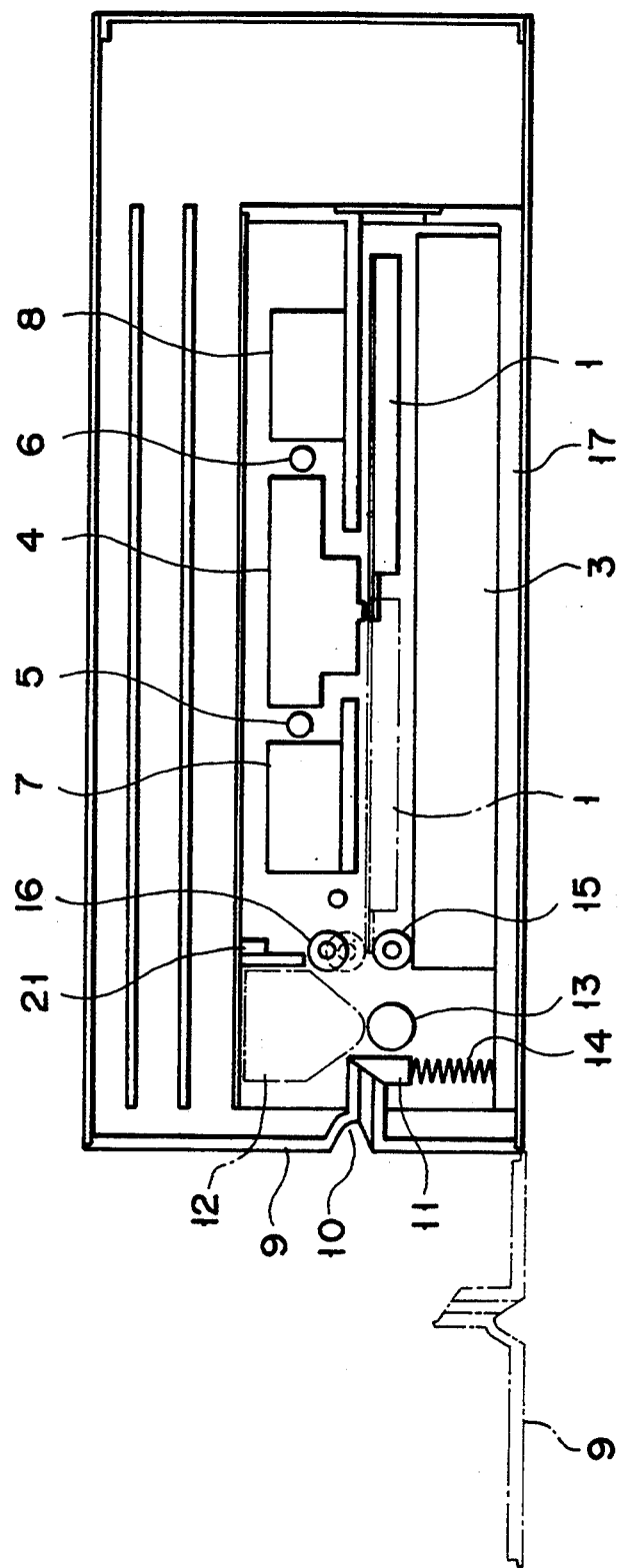
FIG. 1 is a view schematically illustrating a conventional information recording/reproducing apparatus.
Figure 2:
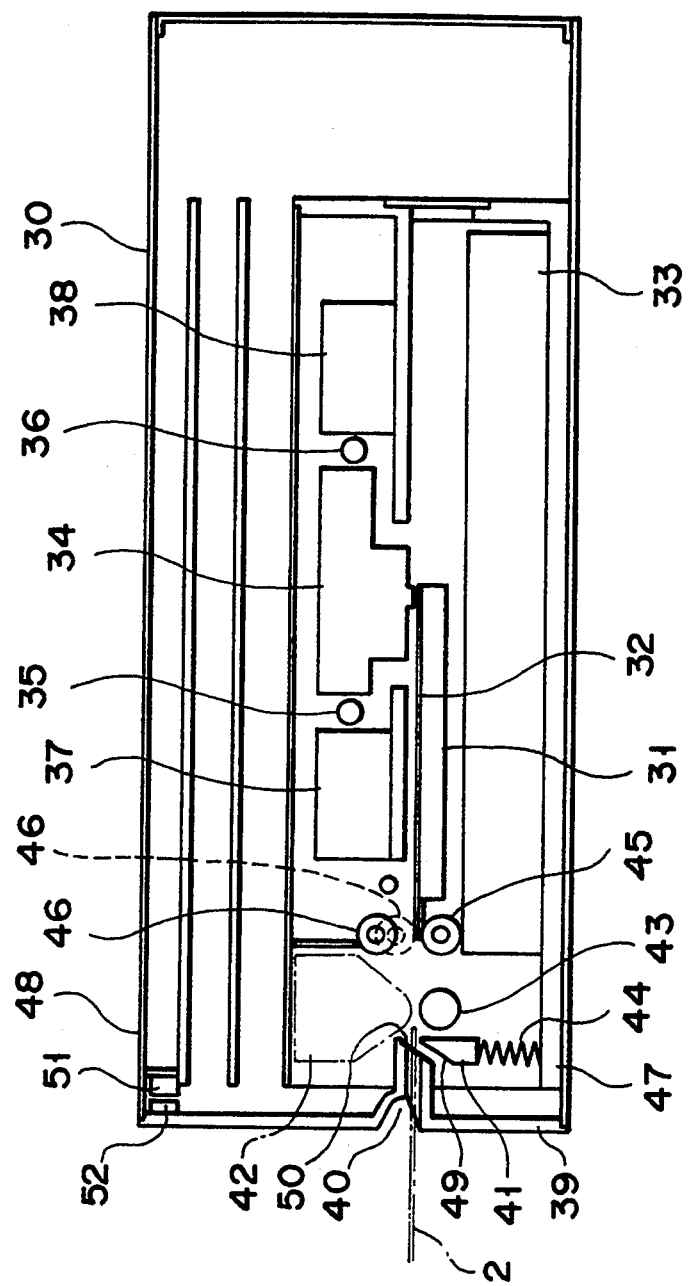
FIGS. 2 and 3 are side views showing an information recording/reproducing apparatus according to a first embodiment of the present invention, with its side plate removed.
Figure 3:
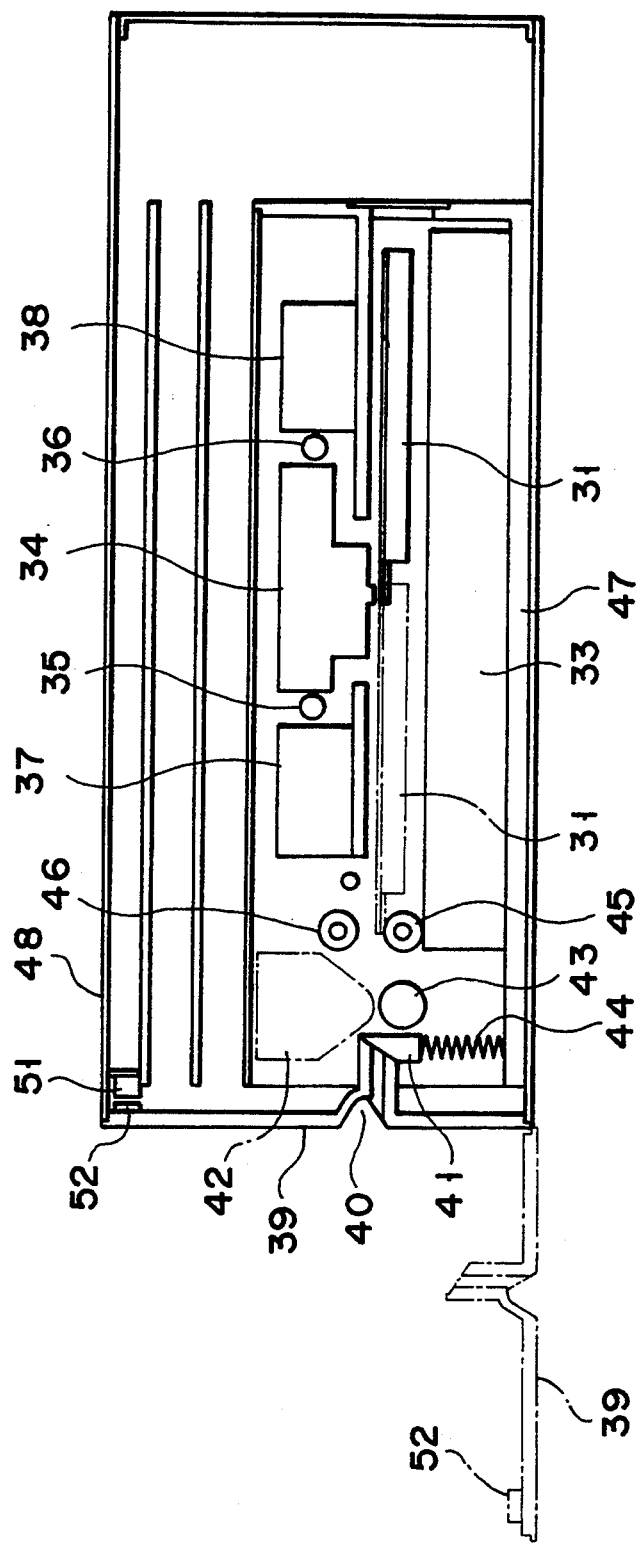

As shown in FIGS. 2 and 3, a card slot 40 for an optical card 2, which has a rectangular cylindrical shape with a flat opening, is formed in a front panel 39 for covering the opening formed in front of a box-shaped housing 30. This card slot 40 has its rear portion extending inside the apparatus to guide the loading of the optical card 2. An inclined surface 50 inclined about 30 degrees toward the lower front side is formed at the rear end portion of the card slot 40. The front panel 39 is pivoted on the apparatus assembly or the housing 30 to be rotatable around its lower end to take two states: the closed state (indicated by the solid line) to close the front opening of the housing 30 and the open state (indicated by the one-dot chain line in FIG. 3) to open the front opening. The opening/closing action of the front panel is realized manually or by electric means.

A shutter 41 is provided at the back of the card slot 40, and is supported on the housing 30 to be movable up and down by means of a guide pin (not shown). A compression spring 44 is disposed between the shutter 31 and a bottom plate 47 to always movably urge the shutter 41 upward. The shutter 41 has an inclined surface 49 corresponding to the inclined surface 50 of the card slot 40 formed at its top surface. When the shutter 41 is urged upward by the spring 44, therefore, this inclined surface 49 closely contacts the inclined surface 50 of the card slot 40, shielding the card loading passage. The shutter 41 is engaged with a solenoid (not shown), and opens the passage for the optical card 2 as it moves downward against the resilient force of the spring 44 due to the attraction by the solenoid.

At the back of the shutter 41, a cleaning device 42 is detachably attached to the housing 30. A roller 43 is rotatably provided below the cleaning section of the cleaning device 42, facing the cleaning section with a given gap. The optical card 2 is carried through the gap between the cleaning section and the roller 43 by conveying means (to be described later) while contacting both. As a result, the information recording surface of the optical card 2 is cleaned by the cleaning section.

At the back of the cleaning device 42 are disposed rollers 15 and 16 which constitute card conveying means.

The roller 45, a drive roller, is located below the passage for the optical card 2, and is coupled to a drive source (not shown) so that it can selectively rotate in either the direction to take the optical card 2 into the apparatus or in the direction to discharge the card out of the apparatus. The other roller or driven roller 46 is disposed above the passage for the optical card 2, facing the roller 45. This roller 46 is attached to an arm which is supported rotatable upward and downward by a link mechanism (not shown). The roller 46 is moved downward to the lower position indicated by the broken line in FIG. 2 by a solenoid (not shown) to firmly abut against the drive roller 45 via the optical card 2, and is freely rotatable in accordance with the movement of the optical card 2 held between both rollers 45 and 46.

At the back of the rollers 45 and 46 is disposed a shuttle 31 that holds the optical card 2 inserted by a loading mechanism. The shuttle can reciprocally move the card 2 to and fro and is driven by a VCM (Voice Coil Motor) 33 located below it. On both sides of the shuttle 31 are provided a pair of guide shafts (not shown) parallel to the loading direction of the optical card 2. The shuttle 31 is supported on the guide shafts to be reciprocal along the guide shafts.

The VCM 33 comprises an outer yoke (not shown) apart from the shuttle 31 and having a pair of magnets (not shown) extending parallel to the guide shafts and respectively located on the right and left sides thereof, a pair of inner yokes (not shown) in the center of the outer yoke and in parallel thereto, and a coil (not shown) attached to the lower portion of the shuttle 31 and fitted over the inner yokes.

When current flows in the coil of the shuttle 31, which passes through the magnetic field formed between the magnets of the outer yoke and the inner yokes, force acting in the running direction of the shuttle 31 is produced in the coil to reciprocate the shuttle 31 along the guide shafts. During the movement of the shuttle 31, the coil moves with some clearance with respect to the outside of the inner yokes.

At the end of the reciprocation region of the shuttle 31 on the front side of the apparatus is provided a lock mechanism 53 which securely positions the shuttle 31 at a predetermined position (as shown in FIG. 2).

This lock mechanism 53 has lock pins 54 and 55 protruding on the top surface of the shuttle 31 on the left and right sides thereof, and a lock plate (not shown) supported on the upper end portion on the front side of the apparatus assembly to be freely horizontally movable in the direction of the arrow in FIG. 4B and in the opposite direction. This lock plate has lock pieces 56 and 57 which are freely engageable with and disengageable from the respective lock pins 54 and 55.

Lock grooves 56a and 57a are formed in the centers of the distal ends of the lock pieces 56 and 57 of the lock plated, while inclined guides 56b and 57b are formed on both sides of the distal ends.

The lock pieces 56 and 57 of the lock plate are retracted to a non-action position (see FIG. 4B) when the apparatus is in its intrinsic operation. As the activation power to urge the lock pieces 56 and 57 toward the non-action position is cut off by an output signal instructing the shuttle 31 to be locked (lock signal), the lock pieces 56 and 57 are moved forward toward a position of action or acting position. Consequently, the lock pins 54 and 55 are engaged respectively with the lock grooves 56a and 57a of both lock pieces 56 and 57 as shown in FIG. 4A. In this state, stopping the movement of the shuttle 31 locks the shuttle 31 there.

In response to an output signal to unlock the shuttle 31 (unlock signal), the lock plate is moved rearward (in the direction o the arrow in FIG. 4B) against the force of the spring to disengage both lock pieces 56 and 57 from the respective lock pins 54 and 55 and return the lock pieces to the non-action position, thereby unlocking the shuttle 31.

As shown in FIGS. 2 and 3, an optical head 34 is provided at the position where it faces the information recording surface of the optical card 2 held by the shuttle 31. The optical head 34 is supported on two guide shafts 35 and 36 to be freely reciprocal along the guide shafts. The guide shafts 35 and 36 extend with a given gap therebetween in parallel to the direction normal to the reciprocal direction of the shuttle 31. VCMs 37 and 38 are disposed outside the guide shafts 35 and 36 to feed driving power to the optical head 34 for their reciprocation.

A permanent magnet 52 is attached to the upper back side of the front panel 39. A detector 51 is provided on an upper plate 48 of the apparatus assembly which faces in close vicinity to the magnet 52 when the front panel 39 is closed. The detector 51 outputs the lock signal and unlock signal in cooperation with the magnet 52 in accordance with the opening/closing action of the front panel 39. The detector 51 outputs the unlock signal when the front panel 39 is closed and the magnetic flux of the magnet 52 acts on the detector 51, and outputs the lock signal when the front panel 39 is open to relieve the action of the magnetic flux of the magnet 52 on the detector.

In the thus constituted information recording/reproducing apparatus, when the user opens the front panel 39 to replace the cleaning device 42, the detector 51 outputs the lock signal. This output signal activates the lock mechanism 53 to move the lock pieces 56 and 57 forward to the acting position. At the same time the shuttle 31 is driven by the VCM 33 to move toward the front side of the apparatus assembly. When the shuttle 31 arrives at the lock position, the lock pieces 56 and 57 engage with the lock pins 54 and 55 of the shuttle 31, positioning and holding the shuttle 31 at the front side within the apparatus. When the shuttle 31 is held there, it completely shields the space that extends from the outside of the apparatus to the important parts inside, such as the optical head 34. If the user tries to insert some device or tool inside, therefore, the shuttle 31 would impede the insertion, thus preventing the important portions (e.g., the optical head 34) from being damaged or preventing the user from being hurt by the laser beam.

Figure 5:
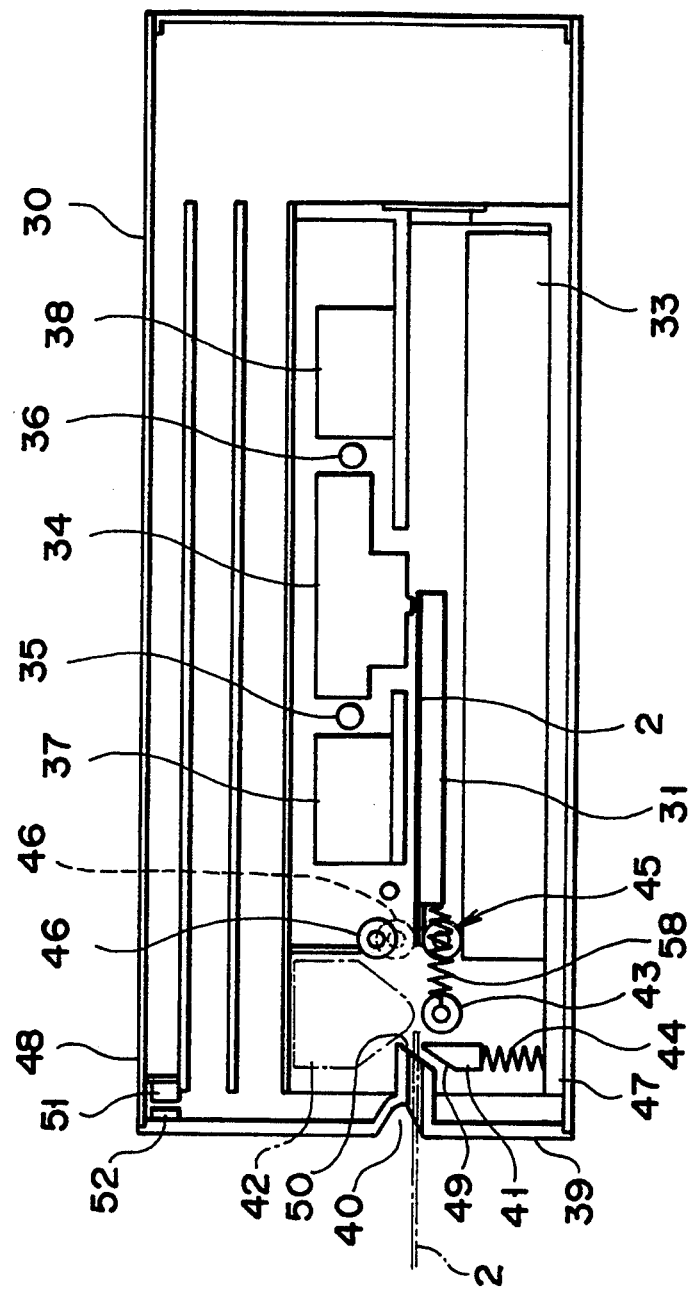
FIGS. 5 and 6 are side views showing an information recording/reproducing apparatus according to a second embodiment of the present invention, with its side plate removed.
Figure 6:
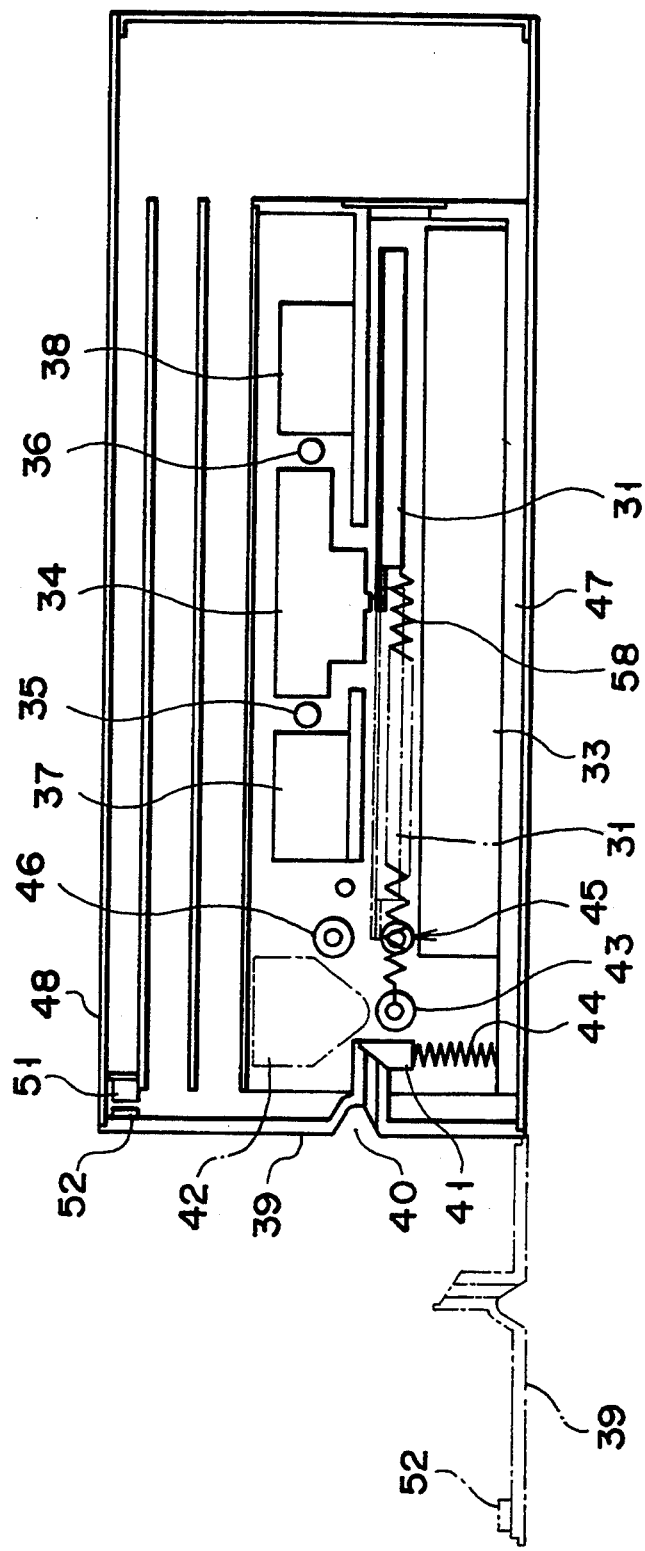

An information recording/reproducing apparatus according to the second embodiment will now be described referring to FIGS. 5 and 6.

The same reference numerals are given to those components in this embodiment which are identical or correspond to those of the first embodiment to avoid their otherwise redundant explanation.

In this embodiment the lock mechanism 53 is constituted of a spring 58. This spring 58 has one end coupled to the front end of the shuttle 31, and the other end positioned at the front portion of the apparatus assembly and coupled to the frame (the rotary bearing of the roller 53 in this embodiment) secured to the housing. The shuttle 31 is always urged toward the front portion of the apparatus assembly by the spring 58, and the tension of the spring 58 when the shuttle 31 is driven by the VCM 33 is set very week compared with the driving power of the VCM so that the tension will not interfere with the reciprocation of the shuttle 31 in the normal R/W operation.

In the information recording/reproducing apparatus with this structure, when the user opens the front panel 39 to replace the cleaning device 42, the detector 51 outputs the lock signal to cut off the power to the VCM 33 that has been driving the shuttle 31. Consequently, the shuttle 31 is moved toward the front portion of the apparatus assembly by the force of the spring 58, and is positioned when the lock pieces 56 and 57 moving forward to the acting position in response to the output signal of the detector 51 engage with the lock pins 54 and 55.

The second embodiment can therefore produce the same effect as the first embodiment.

Figure 7:
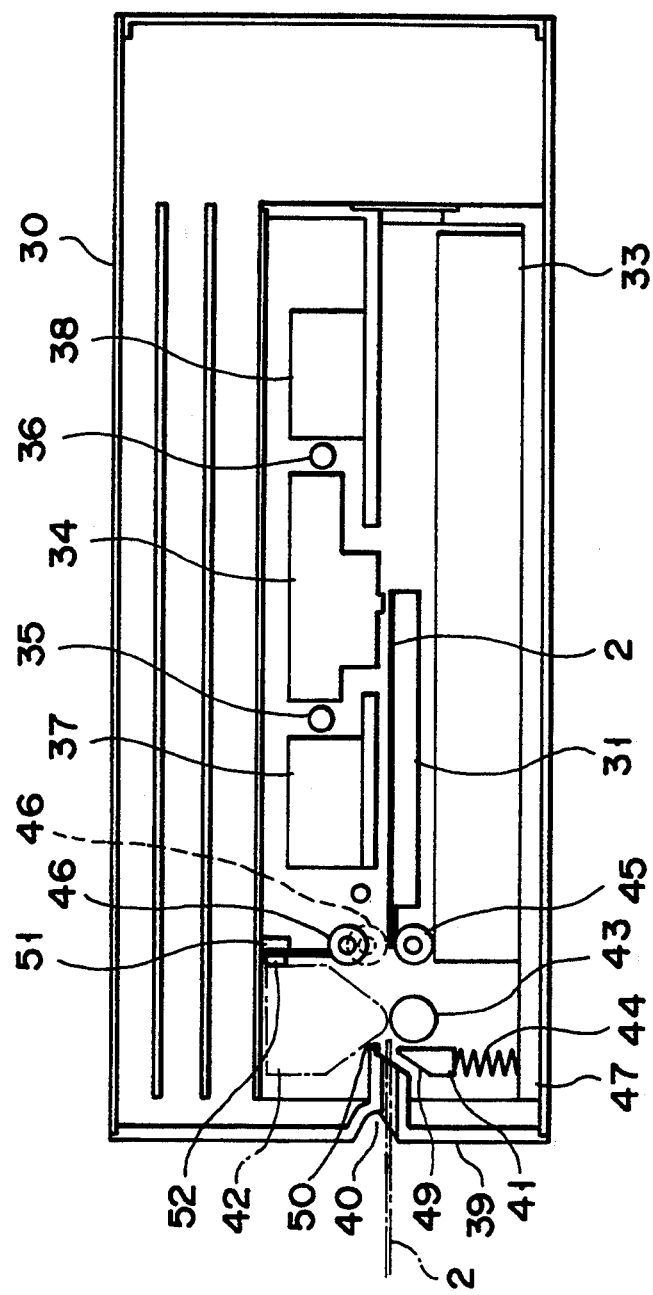
FIG. 7 is a side view of a modification of the first embodiment, with the side plate removed.
Figure 8:
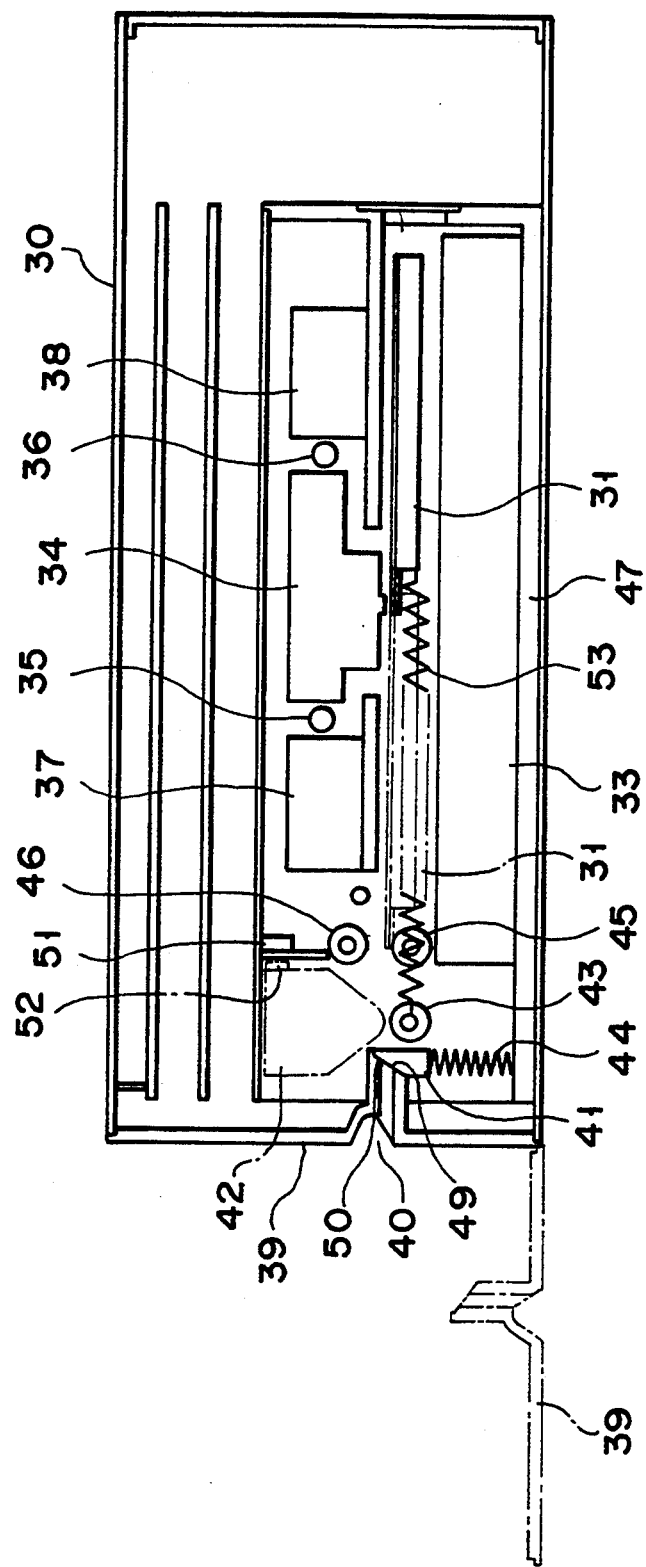
FIG. 8 is a side view of a modification of the second embodiment, with the side plate removed.

While the means far outputting the lock signal and the unlock signal is designed to be interlocked with the opening/closing action of the front panel 39 in both embodiments, this means may be designed to be interlocked with the attachment and detachment of the cleaning device 42 to and from the apparatus assembly, as shown in FIGS. 7 and 8.

The modification shown in FIG. 7 has the same lock mechanism as used in the first embodiment, while the modification in FIG. 8 has the same lock mechanism as used in the second embodiment. In those modifications, the permanent magnet 52 is fixed to the outer surface of the cleaning device 42, and the detector 51 is secured to the frame of the housing 30 near the position where the cleaning device 42 is installed. Therefore the detector 51 outputs the lock signal when the cleaning device 42 is detached from the attaching position, and outputs the unlock signal when the cleaning device 42 is attached.

Although the lock mechanism 53 for the shuttle 31 is mechanical in the first and second embodiments, it is obvious that electrically positioning the shuttle 31 at the loading position can provide an effect equivalent to that obtained by the mechanical locking.

While a sensor for magnetically detecting the magnet 52 has been mentioned as the detector 51, it may be realized by other detectors such as a limit switch and a photointerrupter. The housing 30 should not necessarily have the front end open, but the front panel 39 may be fixed to the housing. In this housing assembly, it is necessary to provide a port in a predetermined portion of the housing assembly to permit removal of the cleaning device.

Although the shuttle 31 is moved when the front panel 39 changes from the close state to the open state in the first and second embodiments, the shuttle 31 may be caused to return to the original position in the close state as follows when the state of the front panel 39 changed to the close state from the open state.

When the opening action of the front panel is detected, it is determined whether or not the shuttle is moved. When the shuttle is not moving, the position of the shuttle is stored as a parameter in a RAM. When the shuttle is moving, this movement is allowed until the track of the movement is scanned, and the position of the shuttle when the track scanning is completed is stored in the RAM. Then, the shuttle is stopped at the front portion of the apparatus and locked there as described earlier. When the front panel is closed, the position of the shuttle is read out from the RAM to return the shuttle to that position.

Figure 10:
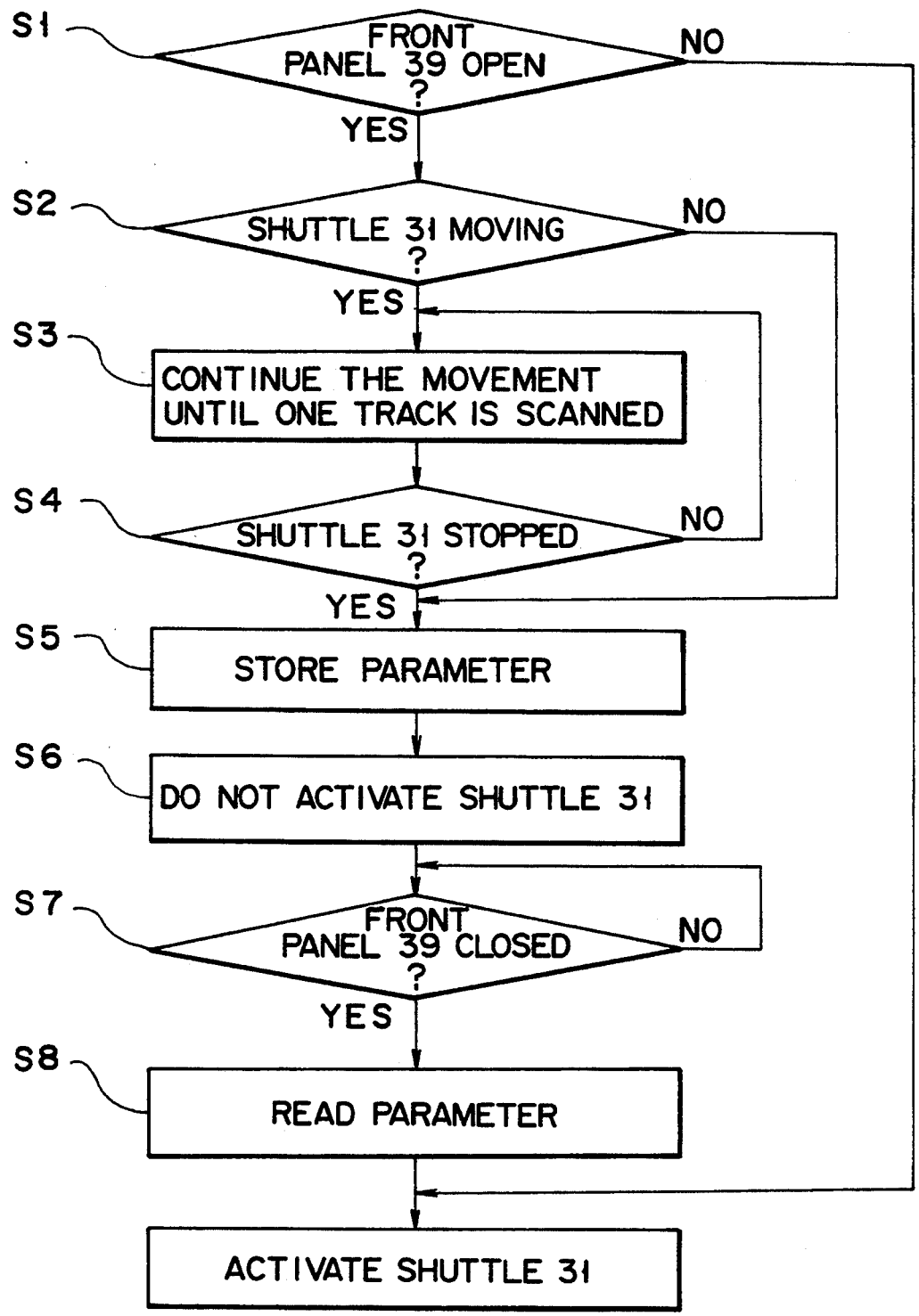
FIG. 10 is a flowchart illustrating the operation of the apparatus.

If it is during the scanning that the position of the shuttle is detected, the operation statuses of the laser light source and servo system may be stored in the RAM, so that these pieces of information can be read out to return the shuttle to the original position when the front panel is closed, as will be explained below referring to FIGS. 9 and 10.

When the front panel is open, this action is detected by the detector 51. Operation stop signal generating means 61a outputs an operation stop signal to drive-system control means 63 in response to the output signal of the detector 51. This drive-system control means 63 has a RAM 65 to store various parameters indicating the current operational statuses of the apparatus. The relationship between the parameters and the operation stop signal generating means 61a will be described referring to FIG. 9.

The states of retaining the optical card 2 are detected, and the RAM 65 stores the inserting and retaining statuses of the optical card 2 as parameters. In this case, if the stored parameter represents the optical card 2 being retained in the shuttle 31, the operation for discharging the optical card 2 would not be performed. If the stored parameter indicates that the optical card 2 is not retained in the shuttle 31, the operation for loading or retaining the optical card 2 would not be performed. That is, when the operation stop signal is input to the drive-system control means 63 in response to the opening of the front panel 39, the lock mechanism will not be activated. This can prevent accidents such as the user's hand caught between the rollers or something caught and taken up by the rollers.

When the front panel is opened during scanning of the information recording surface of the optical card 2, i.e., during the movement of both the shuttle 31 and optical head 34, the following action would be taken. As the operation stop signal is input to the drive-system control means 63, driving the shuttle 31 and the optical head 34 is stopped and the deactivation is maintained. In this case, the shuttle 31 and optical head 34 will be stopped, not immediately, but in the following manner. When the operation stop signal is input to the drive-system control means 63 while the shuttle 31 is moving (while one track is being scanned), the shuttle 31 is permitted to move by a certain distance before fully stopped, i.e., until the scanning of one track is completed. The driving of the shuttle 31 is stopped and kept so at the position where the shuttle 31 is stopped (when the scanning of one track is ended). When the operation stop signal is input to the drive-system control means 63 while the optical head 34 is seeking the target track, the optical head 34 is permitted to reach the target track. Then, the shuttle 31 is driven until that track is scanned. In other words, the optical head 34 and the shuttle 31 are driven until the optical head 34 reaches the target track and scans it. When the shuttle 31 is stopped (when the scanning of one track is completed), the optical head 34 and shuttle 31 will not be activated for the next movement. The stop positions of the optical head 34 and the shuttle 31 are detected by respective photosensors. The detected positions are stored as parameters into the RAM 65.

The RAM 65 stores as parameters the circuit constant (D/A set value) to provide the proper amount of laser emission to ensure the information recording/reproducing in accordance with a card in use, and also the circuit constant to keep the amount of laser emission constant. When the operation stop signal is input to the drive-system control means 63, the semiconductor laser is left activated when it has been turned on, and will not be activated when it has been deactivated.

Also the ID code of the optical card or the operational status or the like of each servo system is stored as a parameter in the RAM 65, so that the drive-system control means 63 can control various other drive systems indicated by the broken lines in FIG. 9.

When the user finishes replacing the cleaning device and closes the front panel 39, the closing of the front panel 39 is detected by the detector 51. Operation restart signal generating means 61b outputs an operation restart signal to the drive-system control means 63 in response to the output signal of the detector 51 to thereby release the stop state kept by the operation stop signal generating means 61a and restart the operation. In response to the operation restart signal, the drive-system control means 63 reads out various parameters from the RAM 65 and resumes the operation, starting immediately from where it has been stopped.

The above operation will now be described specifically based on the flowchart in FIG. 10. This flowchart simply illustrates the relationship between the drive-system control means 63 and the shuttle 31, and illustrates no control of the other drive systems.

When the opening of the front panel 39 is detected (S1), it is determined whether or not the shuttle 31 is moving (S2). When the shuttle 31 is not moving, the stop position is stored as parameter (S5). When the shuttle 31 is moving, the movement is carried out until the associated track is scanned (S3). When it is judged that the shuttle 31 is stopped (S4), the position is stored as a parameter (S5). The shuttle 31 will not be activated until the closing of the front panel 39 is detected by the operation stop signal generating means 61a (S6 and S7). When it is judged that the front panel 39 is closed (S7), the parameters stored so far will be read out (S8). And the shuttle 31 resumes its movement from the state where it has been stopped. This means that the movement of the shuttle 31 starts from where it has been stopped. In other words, every drive system maintains its status at the time the front panel 39 is opened until the front panel 39 is closed again after the previous opening action thereof, and every drive system is driven again from the maintained state immediately upon closing of the front panel 39. This can eliminate the troublesome work of reactivating the entire system from the beginning.

The foregoing description of the operation has been given with reference to the case where the user tries to replace the cleaning device while the system is running, the optical card is retained in the apparatus, and recording/reproducing of information is in progress. In the case where the front panel is opened while the apparatus is powered on and is ready for insertion of an optical card, the values of parameters indicating the operational statuses of the apparatus simply differ from those of the former case, while the operation stop signal generating means, operation restart signal generating means and drive-system control means function in the same manner.

Although the various parameters are stored in the RAM 65 of the drive-system control means and are read out and set again when the operation starts again, the following modification may be made. For instance, to keep the amount of emission from the semiconductor laser, circuits that maintain the voltages and currents of the associated control signals may be provided as hardware so that they are switched from one to the other between the operation stop mode and the operation restart mode.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information recording/reproducing apparatus comprising:
    a housing including a card inserting slot for loading an optical card, and an optical card conveying passage having a first end and a second end, a space being provided between said card inserting slot and said first end of said conveying passage;
    open/close means movable between a closed position in which a part of said space is closed, and an open position in which said space is open;
    a shuttle means for holding the optical card, said shuttle means being reciprocally mounted in said conveying passage in said housing and being reciprocally movable along said conveying passage between said first and second ends thereof when holding the optical card;
    an optical head, disposed facing the optical card held by said shuttle means, for recording information on and reproducing information from said optical card;
    lock means for locking said shuttle means in said conveying passage at said first end thereof; and
    control means including:
        means responsive to said open/close means being moved to said open position for moving said shuttle means to said first end of said conveying passage after said open/close means is opened and when said shuttle means is not at said first end of said conveying passage, and for controlling said lock means to lock said shuttle means at said first end of said conveying passage, such that said shuttle means is locked at said first end of said conveying passage and closes said conveying passage at said first end thereof to prevent a foreign article from being inserted into said conveying passage of said housing, and
        means for controlling said lock means to unlock said shuttle means when said movable open/close means is moved from said opened position to said closed position.

2. An information recording/reproducing apparatus comprising:
    a housing including an optical card conveying passage having a first end and a second end, said housing having one open end;
    movable means, having a card inserting slot, for loading an optical card, said movable means being movable between an open position in which said open end of said housing is open and a closed position in which said open end of said housing is closed, said card inserting slot communicating with said conveying passage at said first end thereof when said movable means is at said closed Position;
    a shuttle means for holding the optical card, said shuttle means being reciprocally mounted in said conveying passage in said housing and being reciprocally movable along said conveying passage between said first and second ends thereof when holding the optical card;
    an optical head, disposed facing the optical card held by said shuttle means, for recording information on and reproducing information from said optical card;
    lock means for locking said shuttle means in said conveying passage at said first end thereof; and
    control means including:
        means responsive to said movable means being moved to said open position for moving said shuttle means to said first end of said conveying passage after said movable means is moved to said open position and when said shuttle means is not at said first end of said conveying passage, and for controlling said lock means to lock said shuttle means at said first end of said conveying passage, such that said shuttle means is locked at said first end Of said conveying passage and closes said conveying passage at said first end thereof to prevent a foreign article from being inserted into said conveying passage of said housing, and
    means for controlling said lock means to unlock said shuttle means when said movable means is moved from said opened position to said closed position.

3. An information recording/reproducing apparatus according to claim 1, wherein said movable open/close means includes a panel pivoted at a first end thereof on said housing so as to be pivotable between said closed position and said open position.

4. An information recording/reproducing apparatus according to claim 3, wherein said control means includes a detector, secured to said housing near a second end of said panel when said panel is in said closed position, for outputting a lock signal when said panel is moved to said open position and for outputting an unlock signal when said panel is moved to said closed position.

5. An information recording/reproducing apparatus according to claim 4, wherein said control means includes a magnet, secured to said second end of said panel, for cooperating with said detector to cause said detector to output said lock signal when said panel is moved to said open position and to output said unlock signal when said panel is moved to said closed position.

6. An information recording/reproducing apparatus according to claim 1, further comprising a cleaning device detachably disposed in said housing near said space provided between said card inserting slot and said first end of said conveying passage.

7. An information recording/reproducing apparatus according to claim 1, wherein said lock means includes at least one first lock member protrusively provided on said shuttle means, and a second lock member movable with respect to said housing so as to be engageable with said first lock member to lock said shuttle means.

8. An information recording/reproducing apparatus according to claim 1, wherein said lock means includes means having one end connected to said shuttle means, and a second end connected to said housing, for resiliently urging said shuttle means toward said first end of said conveying passage.

9. An information recording/reproducing apparatus comprising:
   a housing assembly including a card inserting slot for loading an optical card, and a conveying passage having a first end and a second end, said card inserting slot communicating with said conveying passage at said first end thereof;
   a cleaning device, detachably provided in said housing assembly adjacent to said conveying passage at said first end thereof, for cleaning the optical card to be conveyed;
   a shuttle means for holding the optical card, said shuttle means being reciprocally mounted in said conveying passage in said housing assembly and being reciprocally movable along said conveying passage between said first and second ends thereof when holding the optical card;
   an optical head, disposed facing the optical card held by said shuttle means, for recording information on and reproducing information from said optical card;
   lock means for locking said shuttle means in said conveying passage at said first end thereof; and
   control means including:
      means responsive to said cleaning device being detached from said housing assembly for moving said shuttle means to said first end of said conveying passage after said cleaning means is detached from said housing and when said shuttle means is not at said first end of said conveying passage, and for controlling said lock means to lock said shuttle means at said first end of said conveying passage, such that said shuttle means is locked at said first end of said conveying passage and closes said conveying passage at said first end thereof to prevent a foreign article from being inserted into said conveying passage of said housing, and
      means for controlling said lock means to unlock said shuttle means when said cleaning device is attached to said housing assembly.

10. An information recording/reproducing apparatus according to claim 9, wherein said housing assembly includes a housing having one open end, and a panel coupled to said housing for opening and closing said open end of said housing.

11. An information recording/reproducing apparatus according to claim 1, wherein said lock means includes means for mechanically locking said shuttle means in said conveying passage at said first end thereof.

12. An information recording/reproducing apparatus according to claim 1, wherein said lock means includes means for electrically locking said shuttle means in said conveying passage at said first end thereof.

13. An information recording/reproducing apparatus according to claim 1, wherein said control means includes memory means for storing data indicating whether or not said shuttle means is holding an optical card, such that when said data in said memory means indicates that said shuttle means is not holding an optical card, said control means does not control said lock means to lock said shuttle means.

* * * * *

UNITED STATES PATENT AND TRADEMARK OFFICE
CERTIFICATE OF CORRECTION

PATENT NO. : 5,354,978
DATED : October 11, 1994
INVENTOR(S) : HASHI

It is certified that error appears in the above-indentified patent and that said Letters Patent is hereby corrected as shown below:

On the Title page, Item [57] ABSTRACT:

line 2, "panned" should be --panel--.

line 4, after "formed," insert --a conveying passage having a first end communicating with the card inserting slot,--;

change "device," to --device detachably--;

change "detachable" to --adjacent--;

after "the" insert --first end--.

line 5, change "inside of the housing in a" to --of the--;

delete "on the".

line 6, delete "side of the card inserting slot,".

line 7, change "reciprocal" to --reciprocally mounted--.

line 8, change "in the housing" to --and reciprocally movable--.

UNITED STATES PATENT AND TRADEMARK OFFICE
CERTIFICATE OF CORRECTION

PATENT NO. : 5,354,978
DATED : October 11, 1994
INVENTOR(S) : HASHI

It is certified that error appears in the above-indentified patent and that said Letters Patent is hereby corrected as shown below:

line 9, change "while" to --when--.

line 11, change "on the card inserting slot side" to --at the first end thereof--.

lines 13 and 14, change "unlocking a lock state of the lock mechanism" to --to unlock the shuttle--.

Signed and Sealed this

Twelfth Day of March, 1996

Attest:

BRUCE LEHMAN

Attesting Officer         Commissioner of Patents and Trademarks